United States Patent Office 3,262,891
Patented July 26, 1966

3,262,891
AGGLOMERATION PREVENTION IN ANION EX-
CHANGE AND MIXED EXCHANGE RESINS
USING FINELY DIVIDED BENTONITE
Irving M. Abrams, Redwood City, Calif., assignor to
Diamond Alkali Company, Cleveland, Ohio, a corporation of Delaware
No Drawing. Filed July 9, 1962, Ser. No. 208,560
4 Claims. (Cl. 260—2.1)

This invention relates to ion exchange resin processes, and more particularly to a method for preventing agglomeration of ion exchange resins.

As ion exchanger resins age in service, their capacity declines and deterioration of effluent quality may be observed. Further, performance of these resins may be particularly sensitive to fluctuation in water temperature. These changes are generally due to chemical changes in the resin resulting from loss of active groups or a decrease in crosslinking. The cause is frequently traced to fouling of the resins due to irreversible adsorption of trace ingredients in the influent liquid or to the action of oxidants on the resin. In the examination of hundreds of samples obtained from deionizers which have treated a wide variety of waters, for example, many have shown, in combination with capacity decline and increased moisture content, a phenomenon known as "clumping" or "agglomeration" in which the resin particles adhere to one another in grape-like clusters.

When such an agglomerated sample is backwashed, e.g., in a glass column, the clusters of resin particles rise and free movement of individual particles is inhibited. As a result, the backwash does not achieve the desired orientation of particles in the column and channeling and leakage occur in subsequent regeneration and exhaustion. The result is low capacity and sometimes high leakage.

Although crimping is sometimes observed in strong-base anion exchange resins and in cation exchangers, the phenomenon appears to be most pronounced with weak-base anion exchange resins.

Agglomeration is also frequently observed when new cation and anion exchangers are intimately mixed, especially when they are in the hydrogen and hydroxide forms, respectively. The volume of such mixed resins is frequently much greater than the sum of the volumes of the individual resins.

A principal object of this invention, therefore, is to prevent agglomeration in both new and used ion exchange resins.

Another object of the invention is to improve the properties and increase the useful life of ion-exchange resins.

A further object is to avoid the phenomena of clumping and increase in volume when cation and anion exchange resins are mixed.

These and other objects and advantages of the invention will become apparent to those skilled in the art upon reading the description of the invention which follows.

It has been found that agglomeration of ion exchange resins can be prevented by contacting, typically and preferably by stirring, the resin with an aqueous suspension of bentonite. Treatment of the resin with bentonite overcomes both clumping and volume increase in mixed beds and in fouled or oxidized anion exchangers. In addition, there often results a noticeable increase in total capacity and in breakthrough capacity of the resin, and in many instances, leakage is decreased as demonstrated by a drop in effluent conductivity. Further, these significant improvements in resin performance are lasting rather than transitory.

In general, the minimum quantity of bentonite to be used advantageously can be as little as 0.1 gram per cubic foot of resin. The maximum amount to be used is dictated primarily by cost and practical operating considerations; no specific upper limit has been found at which effectiveness decreases.

The term "bentonite" as used in the specification and claims is intended to refer to the colloidal type, swellable, montmorillonite clay materials generally referred to as bentonite. An especially preferred material, used in the examples of the specification, is −325 mesh Wyoming bentonite. Bentonite has been defined as an earthy unconsolidated deposit consisting chiefly of montmorillonite minerals. The montmorillonite minerals include a group of hydrous alumina-silica materials with which are combined chemically certain amounts of more electropositive ions, such as alkali or alkaline earth metal ions. Among the members of the montmorillonite mineral family are montmorillonite itself, a hydrous aluminum silicate containing chemically combined magnesium or sodium; nontronite, a montmorillonite type material containing ferric and sodium or aluminum ion; hectorite, containing lithium or sodium ion; and saponite containing positive magnesium ion plus positive aluminum or sodium ion. A number of cation and anion exchange resins to which the method of this invention may be applied are chemically identified in Table I.

TABLE I.—IDENTIFICATION OF ION EXCHANGE RESINS COMPOSITION

| Resin | Example | Anion or Cation | Strength | Matrix | Active Group | Supplier or Manufacturer |
|---|---|---|---|---|---|---|
| Amberlite IR-120 | 1 | Cation | Strong | Polystyrene | Sulfonic Acid | Rohm & Haas. |
| Amberlite IRA-400 | 1 | Anion | Strong | ----do---- | Quaternary Ammonium | Do. |
| Amberlite IRC-50 | 1 | Cation | Weak | Acrylic | Carboxylic Acid | Do. |
| Amberlite XE-168 | 1 | Anion | ----do---- | ----do---- | Amine | Do. |
| Dowex 1 | 1 | ----do---- | Strong | Polystyrene | Quaternary Ammonium | Dow Chemical Co. |
| Dowex 50 | 1 | Cation | ----do---- | ----do---- | Sulfonic Acid | Do. |
| Duolite A-7 | 1 | Anion | Weak | Phenolic | Amine | Diamond Alkali Co. |
| Duolite A-30B | 6, 7 | ----do---- | Intermediate | Epoxy Polyamine | Quaternary Ammonium | Do. |
| Duolite A-30T | 1 | ----do---- | ----do---- | ----do---- | ----do---- | Do. |
| Duolite A-101D | 1, 2 | ----do---- | Strong | Polystyrene | ----do---- | Do. |
| Duolite A-120D | 1 | ----do---- | ----do---- | ----do---- | ----do---- | Do. |
| Duolite C-20 | 1, 2, 3, 6 | Cation | ----do---- | ----do---- | Sulfonic Acid | Do. |
| Duolite CS-101 | 1 | ----do---- | Weak | Acrylic | Carboxylic Acid | Do. |
| Kastel C-100 | 1 | ----do---- | ----do---- | Acrylic-COOH | ----do---- | Montecatini. |

The following examples are offered in order that those skilled in the art may achieve a fuller understanding of the invention and the preferred methods by which the same may be carried into effect.

*Example 1*

Examples 1 to 5 show the effect of a bentonite treatment on various mixtures of cation and anion exchangers.

Ten milliliters of a cation exchange resin (20 to 50 mesh) is thoroughly mixed in a graduated cylinder with 10 ml. of an anion exchange resin and the volume of the resulting mixture is measured. Each resin is first treated with an excess of the appropriate reagent to convert it to the desired ionic form and then rinsed free of excess reagent with deionized water. All volumes are tamped (minimum) volumes. Each drained mixed bed is then stirred for 5 minutes with 100 ml. of a suspension of 0.5% by weight bentonite in water at 60° C. Excess bentonite is back-washed out, the resins are again mixed, and volumes are measured as previously.

Some typical results are reported in Table II. The column headed "E" contains the expansion ratios which are defined as follows:

$$E = \frac{\text{Volume after mixing}}{\text{Sum of volumes before mixing}}$$

untreated resins give shorter runs and premature breakthrough.

Example 4

On rare occasions, the effluent quality of a mixed bed ion exchange resin effluent may deteriorate suddenly and inexplicably after some period of service. Laboratory tests on a representative resin sample which has displayed this phenomenon of sudden deterioration show that the

TABLE II.—EFFECT OF BENTONITE ON MIXED BED VOLUMES

| Cation Resin, Ionic Form | Anion Resin, Ionic Form | Before Bentonite | | After Bentonite | |
|---|---|---|---|---|---|
| | | Vol., ml. | E | Vol., ml. | E |
| Duolite C-20, H | Duolite A-101D, OH | 36.0 | 1.80 | 19.8 | 0.99 |
| Duolite C-20, Na | Duolite A-101D, Cl | 28.5 | 1.42 | 19.8 | 0.99 |
| Dowex 50, H | Amberlite IRA-400, OH | 38.0 | 1.90 | 19.7 | 0.98 |
| Amberlite IR-120, H | Dowex 1, OH | 32.0 | 1.60 | 19.8 | 0.99 |
| Duolite C-20, H | Amberlite XE-168, OH | 54.5 | 2.72 | 19.6 | 0.98 |
| Duolite C-20, H | Duolite A-30T, OH | 22.5 | 1.12 | 19.8 | 0.99 |
| Duolite C-20, H | Duolite A-7, OH | 20.4 | 1.02 | 19.5 | 0.98 |
| Amberlite IRC-50, H | Duolite A-30T, OH | 19.8 | 0.99 | 20.0 | 1.00 |
| Kastel C-100, H | Amberlite XE-168, OH | 52.0 | 2.60 | 22.0 | 1.10 |
| Duolite CS-101, H | Duolite A-102D, OH | 42.5 | 1.23 | 19.9 | 1.0 |

The results shown in Table II demonstrate that the clumping or agglomeration of mixed beds is not confined to mixtures of strong-acid and strong-base resins, nor to the resins of any particular manufacturer. Further, there are some combinations of cation and anion exchangers which give no clumping. However, in all instances where this phenomenon does occur, it is eliminated by the bentonite treatment.

Example 2

In an experiment to ascertain whether the effect of the bentonite is on the cation or anion exchange resin, 10 ml. of Duolite C-20 cation exchange resin, in the hydrogen form, is stirred for 5 minutes with 100 ml. of a 0.5% by weight suspension of bentonite in water at room temperature, the excess is washed out, and the resin is mixed with 10 ml. of untreated Duolite A-101D anion exchange resin. Treatment of the cation exchanger alone has no effect on the expansion ratio. Similarly, 10 ml. of untreated Duolite C-20 is mixed with 10 ml. of treated Duolite A-101D. The volumes before and after treatment are 38.0 and 20.0 ml. respectively, indicating that the negatively charged colloidal bentonite reacts favorably with the positively charged anion exchanger.

Example 3

Total ion exchange capacity measurements are made on samples of strong-base resins treated with bentonite suspensions. No significant differences are found in either the salt-splitting or the total capacities between the treated and untreated resins.

Comparative breakthrough runs are also made in the laboratory to determine whether the treatment has any effect on effluent quality or capacity. Forty ml. of hydrogen form cation exchanger (Duolite C-20) is mixed with 60 ml. of a hydroxide form anion exchanger in a 1½ inch glass column containing a gravel support bed. The water is displaced with an 0.25% by weight bentonite suspension and the mixture is agitated with air for about 10 minutes. The bentonite is backwashed out, the backwash (upflow) being maintained for about ½ hour after turbidity disappears. The resins are agitated to effect intimate mixing and flow is begun with a synthetic water simulating that of the Metropolitan Water District of Southern California. For comparison, a mixed bed of the same resins, untreated, is run in parallel.

In all of the comparisons made, the results are similar in that the bentonite-treated resins give extended plateau conductivity values and sharp breakthrough, whereas the strong-acid cation exchanger and the strong-base anion exchanger possess nearly full exchange capacities and normal moisture contents. However, observation of the backwash characteristics reveals very poor separation. The resins appear sticky and a number of "floaters" are present. A bentonite treatment of such resins results in improvement of effluent quality as exhibited by a decrease in conductivity from 1.8 micromhos/cm. to 0.2 micromho/cm. Further, the pronounced sensitivity of effluent quality to increased flow rate is much improved by the treatment.

Example 5

Because a large proportion of the bentonite (a montmorillonite clay) structure consists of oxides of silicon, tests are conducted to determine whether effluents from bentonite-treated mixed ion exchange resin beds contain more silica than untreated beds of the same resins. The bentonite dosage used in these tests is 15 grams per cubic foot of anion exchange resin. In all of these tests, the silica content of the effluent from the treated bed is no higher than that of the effluent from the untreated bed. In fact, in most cases, the effluent silica level is actually lower with the treated columns.

Example 6

The following two examples show the effects of bentonite treatment on samples of used, weak-base anion exchange resins.

A sample of Duolite A-30 B, obtained from a water deionizing facility in western Pennsylvania which has treated about 1 million gallons of water per cubic foot over a three-year period, is found to have low capacity and increased moisture content. On backwashing, it exhibits relatively severe clumping. A portion of this resin is stirred with 1.5 bed volumes of a 0.5% by weight bentonite suspension in water for 15 minutes, after which the resin is backwashed for about 45 minutes to remove excess bentonite. Five successive breakthrough runs are made using this resin, and an untreated sample, following a fully regenerated cation exchanger (Duolite C-20). Regeneration is carried out with a dosage of 5 pounds of sodium hydroxide per cu. ft. applied at a flow rate of 0.5 g.p.m. per cu. ft. Exhaustion flow rate is 2.5 g.p.m./cu. ft. Standard total capacity tests, moisture contents and rinse requirements are also run. Comparative results with the untreated, treated and new resin are shown in Table III. Breakthrough capacities are the averages of the five runs.

TABLE III.—EFFECT OF BENTONITE TREATMENT ON PROPERTIES OF USED DUOLITE A-30 B

| | Untreated | Treated | New Duolite A-30 B |
|---|---|---|---|
| Total Capacity, eq./l | 2.06 | 2.15 | 2.75 |
| Salt-splitting Cap., eq./l | 0.20 | 0.21 | 0.46 |
| Percent Moisture | 69.8 | 68.8 | 54.5 |
| Rinse Req't., gal. per cu. ft. to 10 microns | 114 | 118 | 78 |
| Average Breakthrough Cap., kg. per cu. ft | 17.1 | 19.8 | 26.2 |

Perhaps the most significant result of the bentonite treatment is the 16% improvement in operating capacity. Additional benefits are smoother backwash, more consistently low effluent conductivities and lower pressure drop through the treated bed.

Two samples of bentonite-treated resin are cycled 50 times with 1 N hydrochloric acid and 1 N sodium hydroxide. The resins remain free of agglomeration, indicating that the effect of the clay is a significant and a lasting one.

*Example 7*

A deionizer unit containing 120 cu. ft. of Duolite A-30B, which has processed over 1 million gallons of water/cu. ft. and has been through 620 regeneration cycles, is treated by the method of this invention with a 0.5% by weight bentonite suspension made up in a separate tank and agitated with steam to a temperature of 68° C. This suspension is then introduced to the regenerated, drained resin bed by gravity flow through the top distributor until bentonite appears in the effluent stream. The liquid level is lowered to about 6 inches above the bed level and the resin is air-lanced for 25 minutes, during which time the lance is moved continuously in order to get good agitation throughout the bed. The tank is then closed, filled with water, and the bentonite is backwashed out for a total of 75 minutes. The unit is then returned to service.

The benefits of this treatment are observed immediately. The pressure drop through the unit decreases considerably and its capacity increases from an average of 10 to 13 kg. per cu. ft. before treatment to an average of 17.9 kg. per cu. ft., in eight cycles following the treatment.

Agglomeration of mixed bed ion-exchange resins has been attributed to electrostatic attraction between the particles. In the case of agglomeration of one species of resin, it seems unlikely that the particles would be held together only by electrostatic attraction. The existence of hydrophobic areas on the surface and the mutual attraction of these areas for one another is therefore postulated. Of the two factors (electrostatic attraction and hydrophobic surface), it is believed that the latter is the more dominant cause of clumping in both mixed-bed and multiple-bed operations.

The reason for the existence of hydrophobic areas on the surface of a resin cannot now be stated with certainty. However, since most ion-exchange resins consist of a hydrophobic matrix to which hydrophilic groups are attached, one can imagine the obscuring of some of the active groups, e.g., quaternary ammonium groups, on the surface, in order to explain a temporary unctuous effect in a new mixed resin bed. In the case of a weak-base resin which has seen considerable service, a hydrophobic surface could be generated by loss of amine activity through cleavage of carbon-nitrogen bonds (oxidation) or by irreversible adsorption of a long-chain carboxylic acid (fouling).

The elimination of agglomeration in mixed beds by treatment with bentonite is probably attributable to the neutralization of the electrostatic surface charge. However, the question of whether the bentonite is adsorbed on the resin surface and remains with it or removes a contaminant from the surface and thereafter departs from it has yet to be established. Possibly both occur. The fact that clumping does not recur even after fifty acid-alkaline cycles following the bentonite treatment (Example 6) provides some evidence in favor of the surface-cleansing mechanism. On the other hand, the fact that the bentonite acts only on the anion exchange resin component of a mixed bed strengthens the surface neutralization postulate. However, if bentonite is held on the resin surface, it must be held very tenaciously, since no more silica is found in the effluents of treated mixed beds than in those from untreated columns.

It is to be understood that although the invention has been described with specific reference to particular embodiments thereof, it is not to be so limited, since changes and alterations therein may be made which are within the full intended scope of this invention as defined by the appended claims.

What is claimed is:

1. The method for the prevention of agglomeration of an ion exchange resin selected from the group consisting of anion exchange resins and mixed beds of cation and anion exchange resins which consists of contacting the resin with an aqueous suspension of finely divided bentonite.

2. The method for the prevention of agglomeration in mixed beds of cation and anion exchange resins which comprises stirring the mixture of resins with an aqueous suspension of finely divided bentonite.

3. The method for the prevention of agglomeration of an ion exchange resin consisting of an anion exchange resin which consists of stirring the resin with an aqueous suspension of finely divided bentonite.

4. The method according to claim 3 wherein the anion exchange resin is a weak-base resin.

References Cited by the Examiner

UNITED STATES PATENTS

| 2,883,356 | 4/1959 | Gluesenkamp | 260—2.1 |
| 2,961,417 | 11/1960 | Small | 260—2.1 |

FOREIGN PATENTS 1,045,978  12/1958  Germany.

OTHER REFERENCES

Kunin, Ion Exchange Resins, pp. 6–12, John Wiley and Sons, N.Y., (1958).

WILLIAM H. SHORT, *Primary Examiner.*

J. C. MARTIN, C. A. WENDEL, *Assistant Examiners.*